US009950610B2

(12) United States Patent
Kaneko et al.

(10) Patent No.: US 9,950,610 B2
(45) Date of Patent: Apr. 24, 2018

(54) VEHICLE RADIATOR APPARATUS

(71) Applicant: AISIN SEIKI KABUSHISIKI KAISHA, Kariya-shi, Aichi-ken (JP)

(72) Inventors: Takanobu Kaneko, Kariya (JP); Kiyoichi Kita, Okazaki (JP); Jun Shobo, Anjo (JP); Tamaki Obayashi, Toyama (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/344,759

(22) Filed: Nov. 7, 2016

(65) Prior Publication Data

US 2017/0129324 A1    May 11, 2017

(30) Foreign Application Priority Data

Nov. 9, 2015   (JP) .................. 2015-219396

(51) Int. Cl.
*B60K 11/04*   (2006.01)
*B60K 11/08*   (2006.01)

(52) U.S. Cl.
CPC .......... *B60K 11/04* (2013.01); *B60K 11/085* (2013.01)

(58) Field of Classification Search
CPC ....... B60K 11/04; B60K 11/08; B60K 11/085; B60K 11/06
See application file for complete search history.

(56) References Cited

U.S. PATENT DOCUMENTS

| | | | | |
|---|---|---|---|---|
| 3,888,531 | A * | 6/1975 | Straza | B60R 19/18 188/376 |
| 6,003,912 | A * | 12/1999 | Schonhoff | E02D 3/10 293/122 |
| 8,348,333 | B2 * | 1/2013 | Iammarino | B62D 21/152 296/187.09 |
| 9,010,844 | B2 * | 4/2015 | Hasegawa | B62D 25/082 180/68.1 |
| 2004/0144522 | A1 * | 7/2004 | Bauer | B60K 11/08 165/67 |
| 2004/0239128 | A1 * | 12/2004 | Lanard | B60R 19/00 293/117 |

(Continued)

FOREIGN PATENT DOCUMENTS

| | | |
|---|---|---|
| JP | 2011-201439 | 10/2011 |
| JP | 2014-104825 | 6/2014 |

*Primary Examiner* — Frank B Vanaman
(74) *Attorney, Agent, or Firm* — Finnegan, Henderson, Farabow, Garrett & Dunner, LLP (57) ABSTRACT

A vehicle radiator apparatus includes: a radiator main body; a grill shutter unit configured to adjust the amount of air introduced from an opening in front of the radiator main body and flowing toward the radiator main body; and an air guiding plate provided to extend in a longitudinal direction below the radiator main body and the grill shutter unit to guide the air introduced from the opening to the radiator main body, in which the grill shutter unit includes: a shutter member configured to open or close the opening of a vehicle; and a shutter support member configured to support the shutter member, and including left and right side frame portions and an upper frame portion, and lower ends of the side frame portions are assembled and attached to an upper surface portion of the air guiding plate.

3 Claims, 7 Drawing Sheets

(56) References Cited

U.S. PATENT DOCUMENTS

| | | | | |
|---|---|---|---|---|
| 2006/0225933 A1* | 10/2006 | Kwun | ............... | B62D 25/084 |
| | | | | 180/68.6 |
| 2010/0147611 A1* | 6/2010 | Amano | ............... | B60K 11/085 |
| | | | | 180/68.1 |
| 2010/0243351 A1* | 9/2010 | Sakai | ............... | B60K 11/085 |
| | | | | 180/68.1 |
| 2011/0181062 A1* | 7/2011 | Bernt | ............... | B60K 11/085 |
| | | | | 293/102 |
| 2011/0232981 A1 | 9/2011 | Hori et al. | | |
| 2012/0043051 A1* | 2/2012 | Kurokawa | ............. | B60K 11/08 |
| | | | | 165/41 |

\* cited by examiner

VEHICLE RADIATOR APPARATUS

CROSS REFERENCE TO RELATED APPLICATIONS

This application is based on and claims priority under 35 U.S.C. § 119 to Japanese Patent Application 2015-219396, filed on Nov. 9, 2015, the entire contents of which are incorporated herein by reference.

TECHNICAL FIELD

This disclosure relates to a radiator apparatus for a vehicle.

BACKGROUND DISCUSSION

JP 2011-201439A (Reference 1) discloses a vehicle radiator apparatus. The vehicle radiator apparatus includes a radiator main body, and a grill shutter unit that adjusts the amount of air flowing toward the radiator main body. The grill shutter unit includes a shutter member configured to open or close a grill opening that is an air intake port, a framework-like frame that supports the shutter member, and a drive device that drives the shutter member.

In addition, there is also a case in which an air guiding plate is installed between the radiator main body and the grill shutter unit to guide air introduced from the grill opening to the radiator main body. The air guiding plate is attached to the bottom surface of the grill shutter unit to support the grill shutter unit.

In the vehicle radiator apparatus known in the related art, the frame of the grill shutter unit is formed in a rectangular framework shape, and the grill opening (the open area of the air intake port) is substantially narrowed by the thickness of the framework. Thus, the cooling performance of the vehicle radiator apparatus may be deteriorated.

SUMMARY

Thus, a need exists for a vehicle radiator apparatus which is not susceptable to the drawback mentioned above. However, each constituent requirement of this disclosure should not be interpreted as being limited to the configuration of the corresponding part indicated by the reference numeral of the embodiment.

A feature of an aspect of this disclosure resides in that a vehicle radiator apparatus includes: a radiator main body; a grill shutter unit configured to adjust the amount of air that is introduced from an opening formed in front of the radiator main body and flows toward the radiator main body; and an air guiding plate provided to extend in a longitudinal direction below the radiator main body and the grill shutter unit so as to guide the air introduced from the opening to the radiator main body. The grill shutter unit includes a shutter member configured to open or close the opening of a vehicle and a shutter support member configured to support the shutter member. The shutter support member includes a pair of left and right side frame portions and an upper frame portion that interconnects the upper ends of the side frame portions, and is opened downward. The lower ends of the side frame portions of the grill shutter unit are assembled and attached to the upper surface portion of the air guiding plate.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
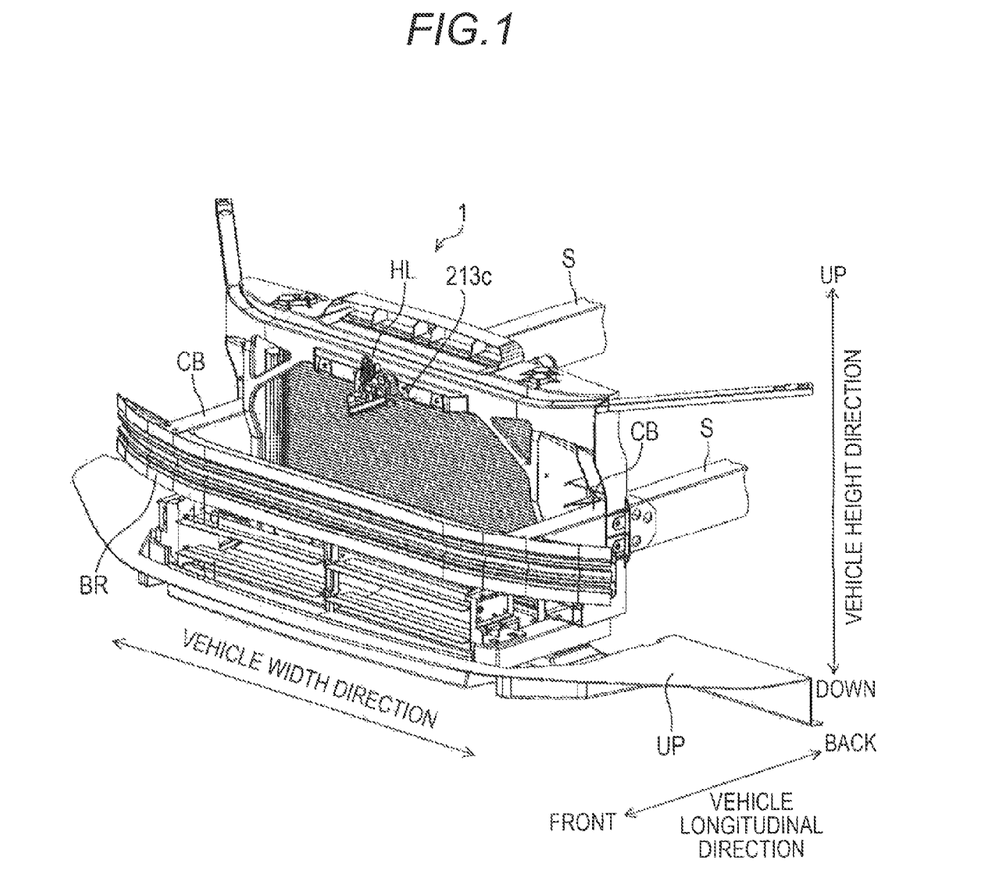
FIG. 1 is a schematic view illustrating the structure of a front portion of a vehicle, to which a vehicle radiator apparatus according to this disclosure is applied.

Hereinafter, a vehicle radiator apparatus 1 according to an embodiment disclosed here will be described. First, the structure of the front end portion of a vehicle, to which the vehicle radiator apparatus 1 is applied, will be described briefly. As illustrated in FIG. 1, the vehicle includes a pair of left and right side members S, S that extend in the vehicle longitudinal direction. Shock absorbing members CB, CB are respectively attached to the front end surfaces of the side members S, S. The shock absorbing members CB, CB are formed in a cylindrical shape that extends in the vehicle longitudinal direction. A bumper reinforcement BR extending in the vehicle width direction is attached to the front end surfaces of the shock absorbing members CB, CB. When an object collides with the front end of the vehicle, the shock absorbing members CB, CB are deformed in the manner of being compressed in the vehicle longitudinal direction, thereby absorbing shock applied due to collision. The vehicle radiator apparatus 1 is located in the space surrounded by the bumper reinforcement BR, the shock absorbing members CB, CB, and the side members S, S.

Figure 2:
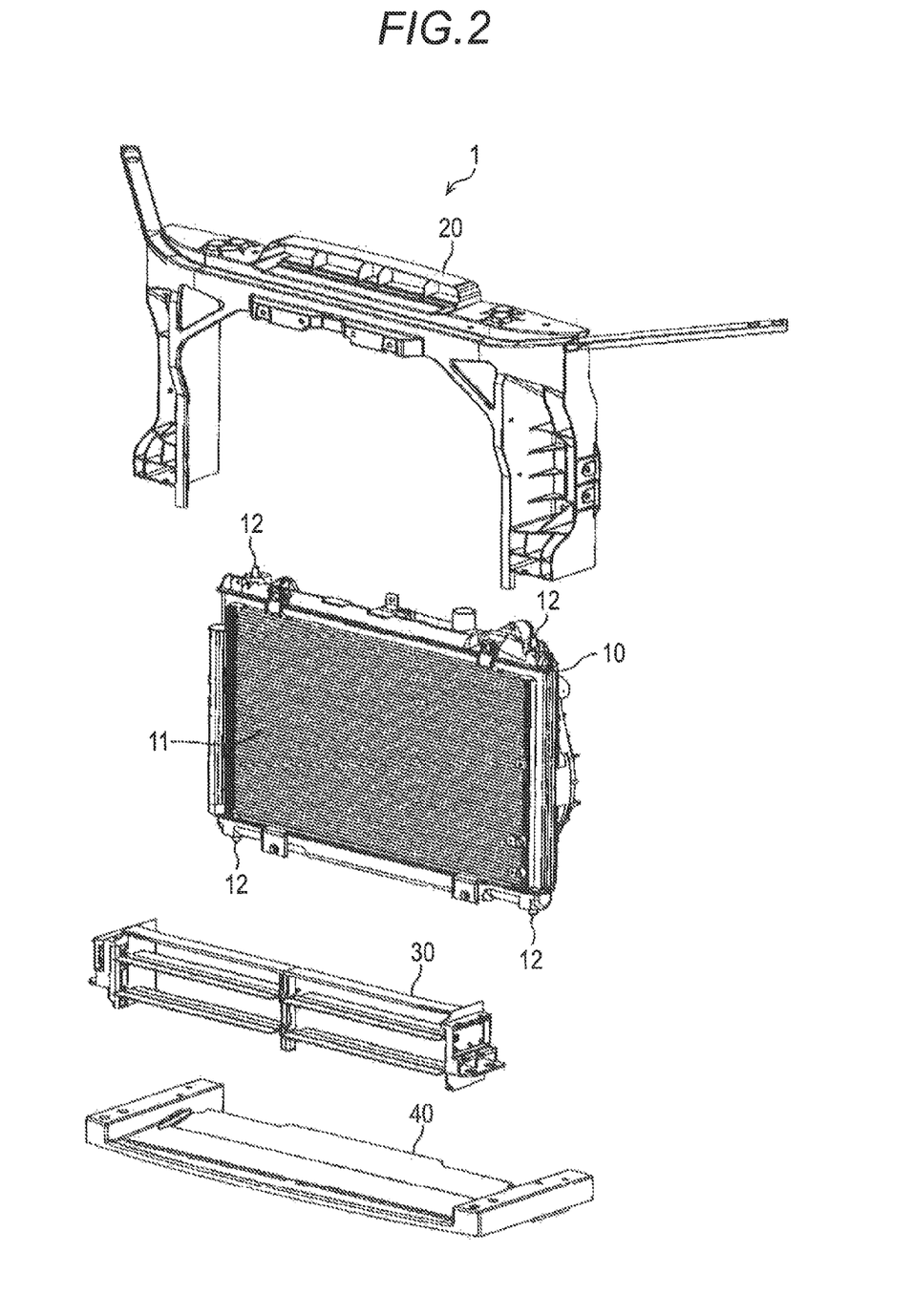
FIG. 2 is an exploded perspective view of the vehicle radiator apparatus of FIG. 1.

Next, the vehicle radiator apparatus 1 will be described in detail. As illustrated in FIG. 2, the vehicle radiator apparatus 1 includes a radiator main body 10, a radiator support member 20, a grill shutter unit 30, and an air guiding plate 40.

The structure of the radiator main body 10 is the same as a radiator main body well-known in the art. That is, the radiator main body 10 is connected to a cooling water flow path installed in an engine, and air-cools cooling water of which the temperature is raised by passing through the engine. That is, the radiator main body 10 includes fins 11 configured to radiate heat of the cooling water. In addition, upwardly and downwardly protruding bush portions 12 are formed respectively on the upper end surface and lower end surface of the radiator main body 10.

Figure 3:
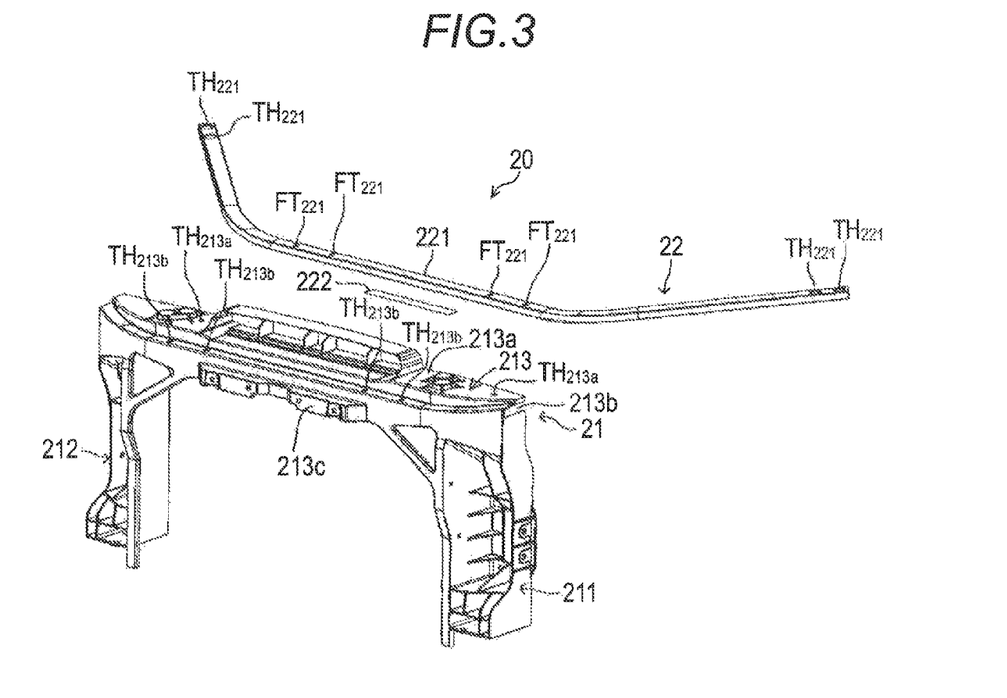
FIG. 3 is an exploded perspective view of a radiator support member.

As illustrated in FIG. 3, the radiator support member 20 includes a main body 21 and a reinforcement unit 22. The main body 21 includes a pair of left and right vertical column portions 211, 212 that are provided to extend in the vehicle height direction, and a horizontal column portion 213 that interconnects the upper ends of the vertical column portions 211, 212. The vertical column portions 211, 212 and the horizontal column portion 213 are integrally formed using a synthetic resin material.

The vertical column portions 211, 212 are provided to extend along the opposite left and right edges of the radiator main body 10. The vertical column portions 211, 212 are formed in a box shape that is opened forward, and plural reinforcement ribs are provided therein.

Figure 4:
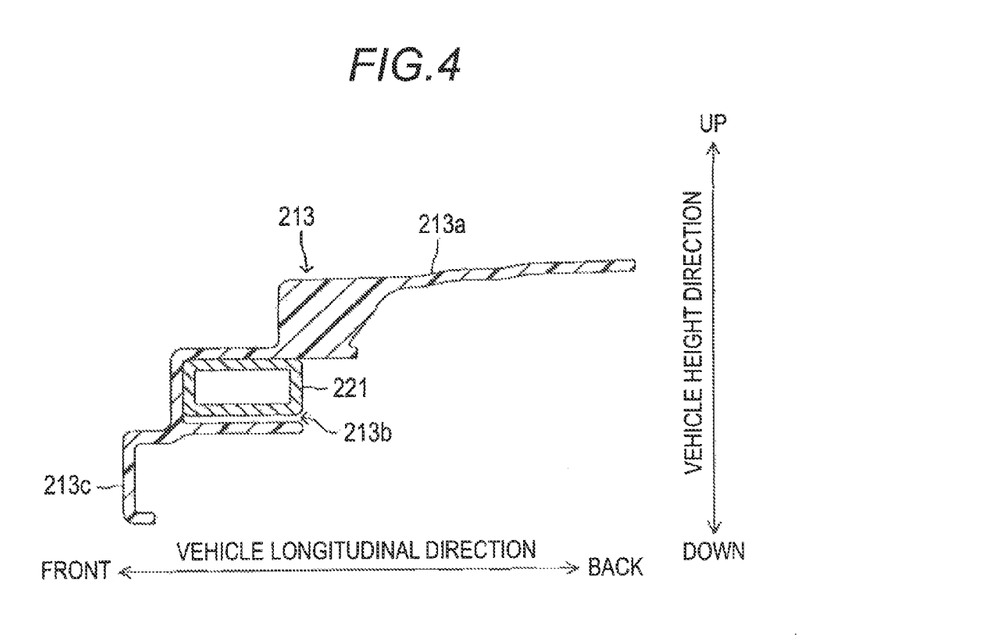
FIG. 4 is a sectional view illustrating a cross section, perpendicular to the vehicle width direction, of a horizontal column portion of the radiator support member.

The horizontal column portion 213 is provided to extend in the vehicle width direction. That is, the horizontal column portion 213 is provided to extend along the upper edge of the radiator main body 10. As illustrated in FIG. 4, the cross section of the horizontal column portion 213, which is perpendicular to the vehicle width direction, has a step shape. The horizontal column portion 213 includes a base portion 213a, a recessed portion 213b, and a protruding portion 213c.

The base portion 213a is formed in a plate shape that extends in the vehicle width direction and is perpendicular to the vehicle height direction. The plate thickness of the front end portion of the base portion 213a is larger than that of the back end portion.

Figure 5:
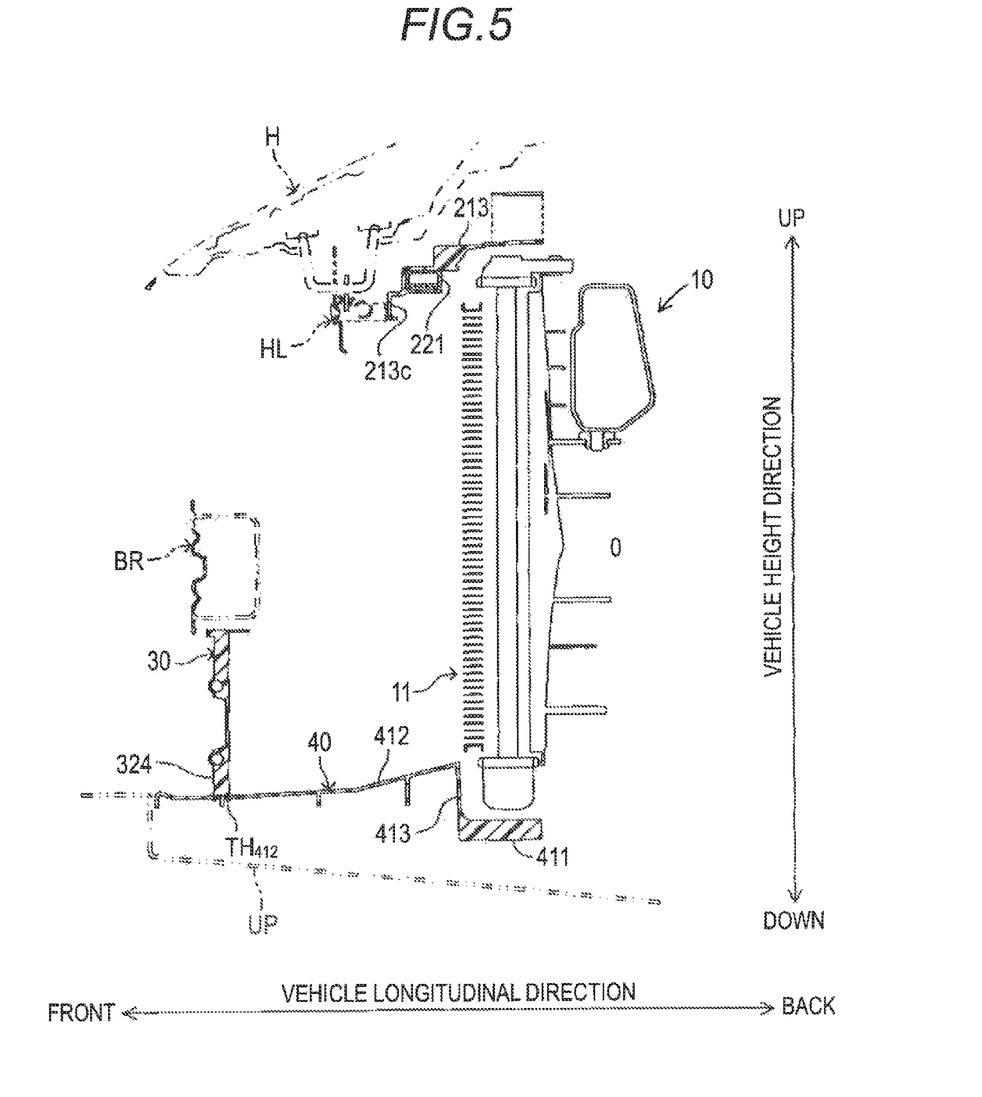
FIG. 5 is a sectional view illustrating a cross section, perpendicular to the vehicle width direction, a central portion in the vehicle width direction in the front portion of the vehicle, to which the vehicle radiator apparatus according to this disclosure is applied.
Figure 6:
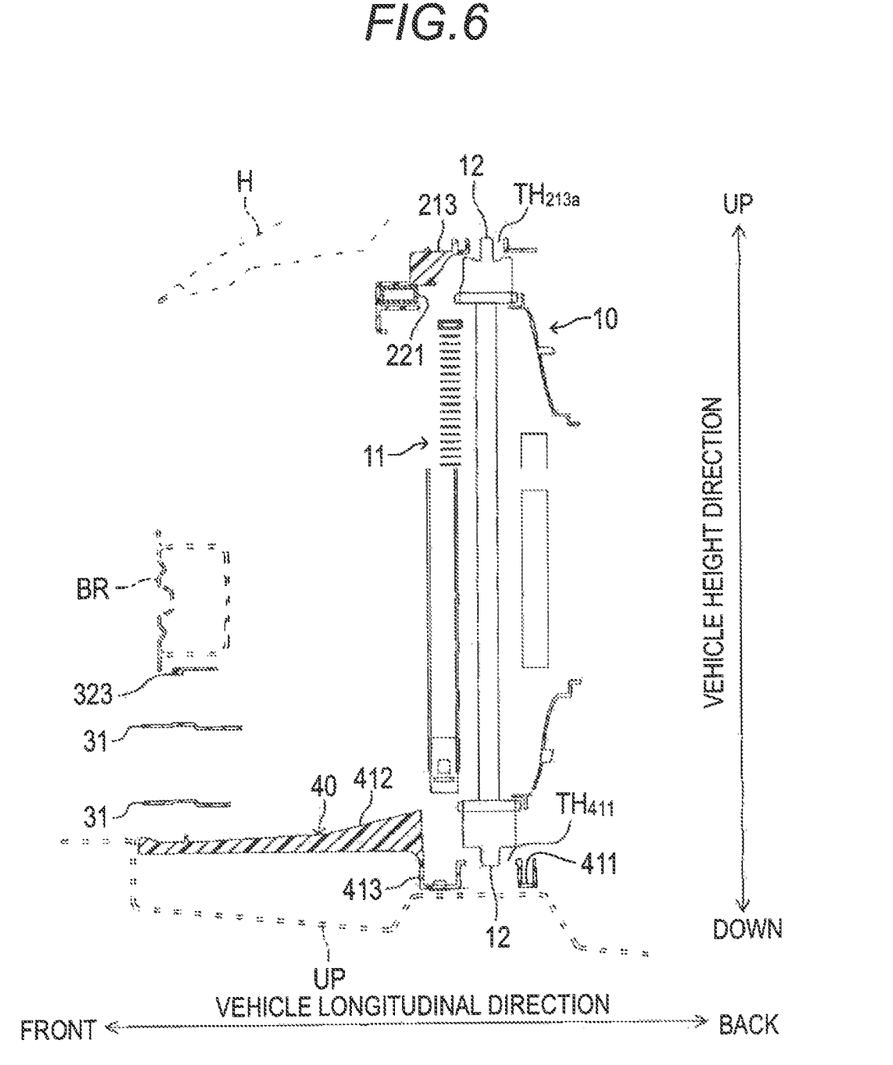
FIG. 6 is a sectional view illustrating a cross section, perpendicular to the vehicle width direction, of a left end portion of a radiator main body in the front portion of the vehicle; to which the vehicle radiator apparatus according to this disclosure is applied.

The recessed portion 213b is connected to the lower end portion in the front side end of the base portion 213a, and is located ahead and below the base portion 213a. The recessed portion 213b is opened backward. The recessed portion 213b is located at the front side of the upper edge of the radiator main body 10 in a state where the radiator main body 10 is supported by the radiator support member 20 (see FIGS. 5 and 6). The reinforcement unit 22 to be described below is inserted into and fixed to the recessed portion 213b.

The protruding portion 213c is connected to the front end portion of the recessed portion 213b, and is located ahead and below the recessed portion 213b. A hood lock HL configured to lock a front end of a vehicle hood H is assembled and attached to the front surface of the protruding portion 213c (see FIGS. 1 and 5). Through-holes $TH_{213a}$ are formed in the left and right ends of the base portion 213a to penetrate the base portion 213a in the vehicle height direction (see FIGS. 3 and 6). The through-holes $TH_{213a}$ correspond to the bush portions 12, In addition, two through-holes $TH_{213b}$ are formed in each of the left and right ends of the recessed portion 213b to inwardly penetrate the recessed portion 213b from the upper surface thereof (see FIG. 3). A bolt is inserted into each through-hole $TH_{213b}$ to fix the reinforcement unit 22 to be described subsequently.

The reinforcement unit 22 includes a tubular portion 221 and a reinforcement sheet 222 (see FIG. 3). The tubular portion 221 is formed in an angled tube shape that extends in the vehicle width direction. The tubular portion 221 is longer than the horizontal column portion 213 of the radiator support member 20. That is, the tubular portion 221 protrudes leftward and rightward from the main body 21 in a state of being fixed to the recessed portion 213b. The central portion of the tubular portion 221 in the longitudinal direction is parallel to the vehicle width direction. Portions are bent backward that are middle portions in the longitudinal direction of the tubular portion 221 and are respectively located at the left end and the right end of the main body 21 in a state where the reinforcement unit 22 is fixed to the recessed portion 213b. Each of left and right protrusions is formed to extend obliquely backward and linearly that are the end portions of the tubular portion 221 and respectively protrude from the main body 21. Through-holes $TH_{221}$ are formed in each of the tip end portions of the protrusions (i.e., left and right end portions) to penetrate the protrusions in the vehicle height direction. A bolt is inserted into each of the through-holes $TH_{221}$ to fix the vehicle radiator apparatus 1 to the vehicle main body. In addition, female screws $FT_{221}$ are formed in the upper wall portion of the central portion of the tubular portion 221 in the longitudinal direction (i.e., the portion formed to be parallel to the vehicle width direction), The female screws $FT_{221}$ correspond to the through-holes $TH_{213b}$.

The tubular portion 221 is formed in the following manner. First, a linearly extending angled tube is formed by extruding a metal material (e.g., an aluminum alloy material), Then, middle portions of the angled cylinder in the longitudinal direction (i.e., portions respectively located at the left end and the right end of the main body 21) are bent backward. Subsequently, the through-hole $TH_{221}$ and the female screw $FT_{221}$ are formed. In this way, the tubular portion 221 is formed.

The reinforcement sheet 222 is formed of carbon fiber reinforced plastic (CFRP). The reinforcement sheet 222 is formed in a sheet shape that extends in the vehicle width direction and is perpendicular to the vehicle height direction. The reinforcement sheet 222 is bonded to a lower surface of the central portion of the tubular portion 221 in the vehicle width direction.

The reinforcement unit 22 is fixed to the recessed portion 213b in the following manner. First, the reinforcement unit 22 is inserted into the recessed portion 213b. Then, a bolt is inserted into each of the through-holes $TH_{213b}$ and the tip end of the bolt is fastened to each of the female screws $FT_{221}$. In this way, the reinforcement unit 22 is fixed to the recessed portion 213b.

Figure 7:
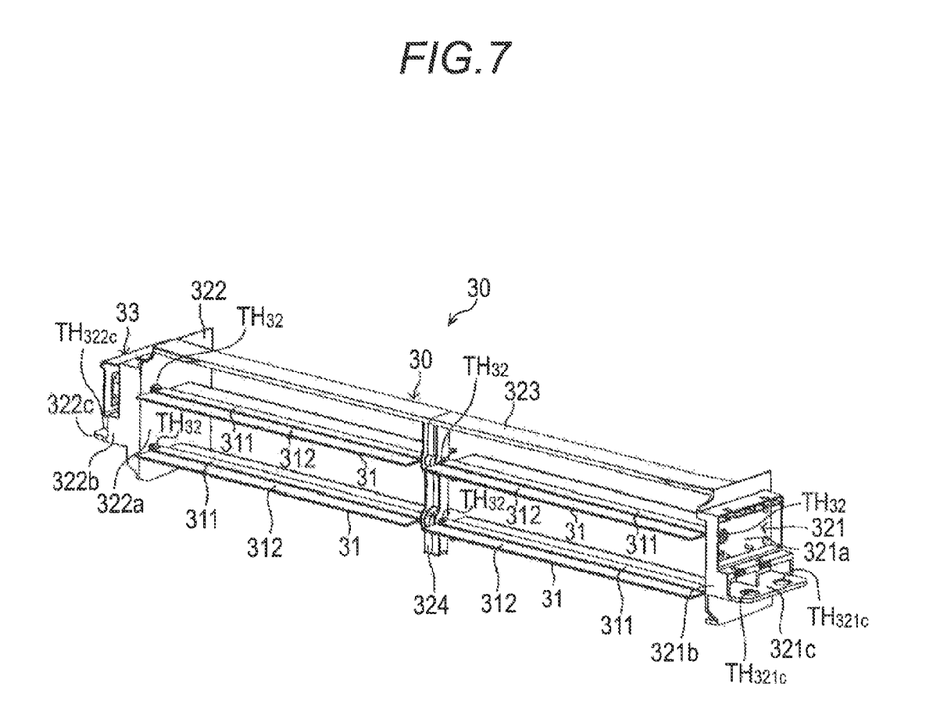
FIG. 7 is a perspective view of a grill shutter unit.

The grill shutter unit 30 is located in the grill opening of the vehicle in a state where the vehicle radiator apparatus 1 is assembled and attached to the vehicle so as to adjust the amount of air introduced into the engine room from the grill opening and flowing toward the radiator main body 10. As illustrated in FIG. 7, the grill shutter unit 30 includes plural (e.g., four (4)) shutter members 31, a shutter support member 32 to support the shutter members 31, and a drive unit 33 to drive the shutter members 31.

Each of the shutter members 31 includes a shaft portion 311 and a plate-shaped portion 312. The shaft portion 311 is formed in a bar shape that extends in the vehicle width direction. The plate-shaped portion 312 is formed in a plate shape that extends in the vehicle width direction. The shaft portion 311 is formed in the center of the plate-shaped portion 312 in the width direction (i.e., the direction perpendicular to the vehicle width direction and the plate thickness direction).

The shutter support member 32 includes a pair of left and right side frame portions 321, 322 that extends in the vehicle height direction, an upper frame portion 323 that interconnects the upper ends of the side frame portions 321, 322, and a reinforcement portion 324 that supports the center of the upper frame portion 323. The side frame portion 321 is formed in a box shape that is opened leftward. That is, the side frame portion 321 includes a bottom wall portion 321a that is perpendicular to the vehicle width direction, and a peripheral wall portion 321b that surrounds the periphery of the bottom wall portion 321a. Moreover, the side frame portion 321 includes a bracket portion 321c provided to extend leftward from the bottom wall portion 321a and is formed in a plate shape that is perpendicular to the vehicle height direction, A through-hole $TH_{321c}$ is formed in the bracket portion 321c to penetrate the bracket portion 321c in the vehicle height direction. The side frame portion 322 has a shape bilaterally symmetrical with the side frame portion 321. That is, like the side frame portion 321, the side frame portion 322 includes a bottom wall portion 322a, a peripheral wall portion 322b, and a bracket portion 322c. In addition, a through-hole $TH_{322c}$ is formed in the bracket portion 322c, The upper frame portion 323 is formed in a plate shape that extends in the vehicle width direction and is perpendicular to the vehicle height direction. The reinforcement portion 324 is formed in a column shape that extends downward from the center of the upper frame portion 323 in the vehicle width direction. The side frame portions 321, 322, the upper frame portion 323, and the reinforcement portion 324 are integrally formed using a synthetic resin material.

The drive unit 33 includes a drive shaft that is configured to rotate about the center axis extending in the vehicle width direction. The drive unit 33 includes a motor (e.g., a stepping motor configured to adjust the rotating angle of the drive shaft. The drive unit 33 is assembled and attached to a right side surface of the bottom wall portion 322a of the side frame portion 322.

Two through-holes $TH_{32}$ are formed in each of the side frame portions 321, 322 and the reinforcement portion 324 to penetrate each of the side frame portions 321, 322 and the reinforcement portion 324 in the vehicle width direction. The two through-holes $TH_{32}$ are spaced apart from each other in the vehicle height direction. The shaft portion 311 of each shutter member 31 is inserted into the through-holes $TH_{32}$. Thereby, the shutter member 31 is supported to rotate about the center axis of the through-holes $TH_{32}$. Two shutter members 31, 31 are supported between the side frame portion 321 and the reinforcement portion 324, and the other two shutter members 31, 31 are supported between the side frame portion 322 and the reinforcement portion 324. The shaft portions 311, 311 of the shutter members 31, 31 at the right side are connected to the drive shaft of the drive unit 33. The shaft portions 311, 311 of the shutter members 31, 31 at the left side are connected to the shaft portions 311, 311 of the shutter members 31, 31 at the right side via a coupling member (not illustrated). As the drive shaft of the drive unit 33 rotates, each shutter member 31 rotates about the center axis of the shaft portion 311. In addition, all the shutter members 31 rotate in the same direction. The amount of air introduced from the grill opening into the engine room may be adjusted by adjusting the rotation angle of the shutter member 31.

Figure 8:
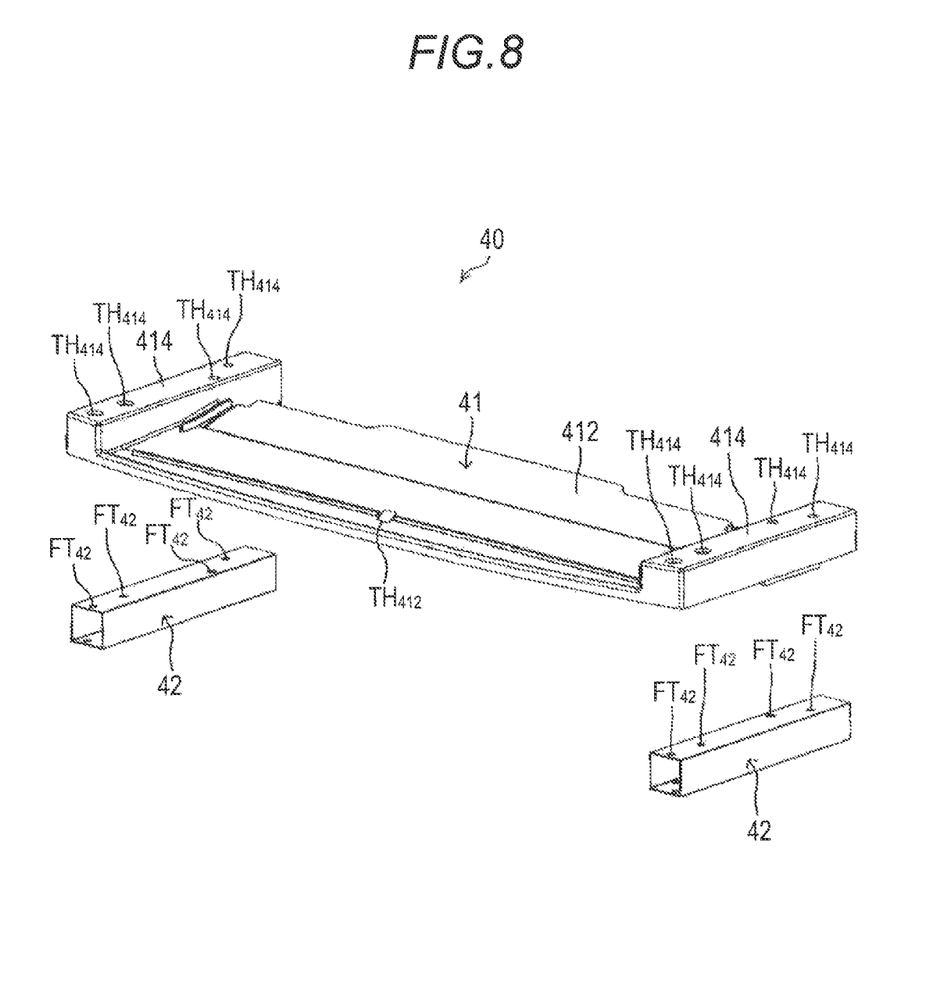
FIG. 8 is a perspective view of an air guiding plate.

As illustrated in FIG. 8, the air guiding plate 40 includes a plate-shaped portion 41 and shock absorbing members 42, 42. The plate-shaped portion 41 includes a base end portion 411, a main body 412, a connection portion 413, and holding portions 414, 414 (see FIGS. 5 and 6).

The base end portion 411 is formed in a plate shape that extends in the vehicle width direction from a back end of the plate-shaped portion 41 and is perpendicular to the vehicle height direction. Through-holes $TH_{411}$ are formed in the base end portion 411 to penetrate the base end portion 411 in the vehicle height direction (see FIG. 6). The through-holes $TH_{411}$ correspond to the bush portions 12.

The main body 412 is located ahead and above the base end portion 411. The main body 412 is formed in a plate shape that extends in the vehicle width direction and the vehicle longitudinal direction. The front end of the main body 412 is formed in a plate shape that is perpendicular to the vehicle height direction. A portion of the main body 412 from the center to the back end in the vehicle longitudinal direction is bent upward. In addition, a through-hole $TH_{412}$ is formed in the front end of the main body 412 to penetrate the main body 412 in the vehicle height direction. The through-hole $TH_{412}$ is located in the center in the vehicle width direction. In addition, plural reinforcement ribs are formed on the lower surface of the main body 412.

The connection portion 413 is formed in a plate shape that extends in the vehicle width direction and is perpendicular to the vehicle longitudinal direction. The upper end of the connection portion 413 is connected to the back end of the main body 412, and the lower end of the connection portion 413 is connected to the front end of the base end portion 411.

The holding portions 414, 414 are respectively connected to the left and right ends of the main body 412 (see FIG. 8). The holding portions 414 are formed in a box shape that extends in the vehicle longitudinal direction and is opened downward. Four through-holes $TH_{414}$ are formed in a wall portion at the upper side of the holding portion 414 (i.e., an upper bottom portion) so as to penetrate in the vehicle height direction. The four through-holes $TH_{414}$ are spaced apart from one another in the vehicle longitudinal direction.

The shock absorbing member 42 is formed in an angled tube shape that extends in the vehicle longitudinal direction. The shock absorbing member 42 is formed by extruding, for example, a metal material (an aluminum alloy material). Four female screws $FT_{42}$ are formed in a wall portion at the upper side of the shock absorbing member 42 to correspond to four through-holes $TH_{414}$, respectively. The shock absorbing members 42, 42 are inserted into the holding portions 414, 414 from the lower side of the holding portions 414, 414. In addition, as bolts are inserted into the through-holes $TH_{414}$ and tip ends of the bolts are fastened to the female screws $FT_{42}$, the shock absorbing members 42, 42 are fixed to the holding members 414, 414. In addition, first, bolts are fastened to only two female screws $FT_{42}$ at the back side, among the four female screws $FT_{42}$ of the shock absorbing member 42 so that only the back side portion of the shock absorbing member 42 is fixed to the holding portion 414. Then, as described subsequently, in a process of assembling the vehicle radiator apparatus 1, bolts are fastened to the other two female screws $FT_{42}$ so that the front side portion of the shock absorbing member 42 is fixed to the holding portion 414.

Subsequently, the sequence of assembling the vehicle radiator apparatus 1 will be described (see FIG. 2). First, the bush portions 12 at the lower side of the radiator main body 10 are inserted into the through-holes $TH_{411}$ of the air guiding plate 40 so that the radiator main body 10 is placed on the upper surface of the base end portion 411 of the air guiding plate 40. Subsequently, the radiator support member 20 is lowered from above the radiator main body 10 so that the bush portions 12 at the upper side of the radiator main body 10 are inserted into the through-holes $TH_{213a}$ of the radiator support member 20. Then, the lower ends of the vertical column portions 211, 212 are assembled and attached to the base end portion 411. In this state, the height of the back end of the main body 412 of the air guiding plate 40 coincides with the height of lower ends of the fins 11 of the radiator main body 10. After passing through the grill shutter unit 30, air flows along the main body 412. That is, air introduced into the engine room flows toward the fins 11. Subsequently, the lower end of the reinforcement portion 34 of the grill shutter unit 30 is inserted into the through-hole $TH_{412}$ of the air guiding plate 40, and the bracket portions 321c and 322c are placed on the upper surfaces of the holding portions 414, 414. The through-holes $TH_{321c}$, $TH_{322c}$ in the bracket portions 321c, 322c correspond to two through-holes $TH_{414}$ in the front side of each of the holding portions 414, 414 and two female screws $FT_{42}$ in the front side of each of the shock absorbing members 42, 42. Bolts are inserted into the through-holes $TH_{321c}$, $TH_{322c}$ and the through-holes $TH_{414}$ and are fastened to the female screws $FT_{42}$. Thereby, the grill shutter unit 30 is fixed to the air guiding plate 40, and the front side portion of the shock absorbing member 42 is fixed to the air guiding plate 40. In the above-described manner, the vehicle radiator apparatus 1 is assembled.

The vehicle radiator apparatus 1 is inserted into the engine room from the lower side of the engine room and is assembled and attached to the vehicle main body, Specifically, opposite ends of the reinforcement unit 22, the vertical column portions 211, 212, and the holding portions 414, 414 are fastened to members (e.g., side members) that constitute the framework of the vehicle. In addition, an under-plate UP is assembled and attached to the lower side of the vehicle radiator apparatus 1 (see FIG. 1).

According to the vehicle radiator apparatus 1 configured as described above, the main body 21 of the radiator support member 20 is formed of a synthetic resin material, and the horizontal column portion 213 thereof is reinforced by the metal reinforcement unit 22. Accordingly, the weight may be reduced and high rigidity may be maintained, compared to a case where the entire radiator support member is formed of a metal. In particular, because the reinforcement unit 22 (the tubular portion 221) is formed in the tube shape that extends in the vehicle width direction, torsional rigidity is high, compared to a horizontal column portion formed in a groove shape that is opened downward, as in the conventional radiator support member. In addition, the reinforcement sheet 222 formed of carbon fiber reinforced plastic is bonded to the lower surface of the central portion in the vehicle width direction. Accordingly, rigidity (bending rigidity) against an external force that downwardly presses the central portion of the horizontal column portion 213 in the vehicle width direction is high. Accordingly, the deformation of the horizontal column portion 213 may be suppressed even if a relatively large load is applied to the horizontal column portion 213 via the hood lock HL when the hood H is opened or closed. In addition, in the vehicle radiator apparatus 1, the reinforcement unit 22 is located in front of the upper end of the radiator main body 10. Accordingly, the dimension of the vehicle radiator apparatus 1 in the vehicle height direction may be reduced, compared to a case where the reinforcement unit 22 is located above the radiator main body 10.

In addition, the shutter support member 32 of the grill shutter unit 30 is opened downward. That is, the lower frame portion in the conventional grill shutter unit is omitted, and the lower ends of the side frame portions 321, 322 are directly assembled and attached to the air guiding plate 40. Accordingly, the grill opening may be substantially enlarged by the lower frame portion, compared to the conventional grill shutter unit. Accordingly, the cooling performance of the radiator apparatus may be improved. In addition, the number of parts may be reduced, compared to the conventional grill shutter unit.

In addition, as in the shutter support member 32, the radiator support member 20 is also opened downward so that the lower ends of the vertical column portions 211, 212 are directly assembled and attached to the air guiding plate 40. Accordingly, the number of parts may be reduced, compared to a case where the lower frame portion of the radiator support member 20 is installed as a separate member.

In addition, because the air guiding plate 40 includes the shock absorbing member 42, more shock may be absorbed, compared to a vehicle having only the shock absorbing member CB, In addition, the shock absorbing member 42 is accommodated and fixed in the holding portion 414 formed in a box shape. Thus, the bending of the shock absorbing member 42 in the direction of the center axis thereof is suppressed. In other words, at the time of collision, the shock absorbing member 42 is deformed in the manner of being compressed in the direction of the center axis thereof. Accordingly, shock is efficiently absorbed.

In addition, the lower ends of the side frame portions 321, 322 of the grill shutter unit 30 are assembled and attached to the shock absorbing members 42, 42 that have relatively high rigidity. Accordingly, the grill shutter unit 30 may be stably maintained.

Moreover, the implementation of this disclosure is not limited to the embodiment, and may be changed in various ways so long as it does not deviate from the object disclosed here.

For example, although the reinforcement sheet 222 is bonded to the tubular portion 221 in the embodiment, the tubular portion 221 and the reinforcement sheet 222 may be integrally formed (e.g., insert-molded). In addition, not only the wall portion at the lower side of the central portion of the tubular portion 221 in the vehicle width direction, but also a portion over a wider range may be reinforced by the reinforcement sheet 222. For example, the entire peripheral portion of the central portion of the tubular portion 221 in the vehicle width direction may be reinforced by the reinforcement sheet 222, In addition, the reinforcement sheet 222 is not limited to carbon fiber reinforced plastic, and may be formed using any other material.

A feature of an aspect of this disclosure resides in that a vehicle radiator apparatus includes: a radiator main body; a grill shutter unit configured to adjust the amount of air that is introduced from an opening formed in front of the radiator main body and flows toward the radiator main body; and an air guiding plate provided to extend in a longitudinal direction below the radiator main body and the grill shutter unit so as to guide the air introduced from the opening to the radiator main body. The grill shutter unit includes a shutter member configured to open or close the opening of a vehicle and a shutter support member configured to support the shutter member. The shutter support member includes a pair of left and right side frame portions and an upper frame portion that interconnects the upper ends of the side frame portions, and is opened downward. The lower ends of the side frame portions of the grill shutter unit are assembled and attached to the upper surface portion of the air guiding plate.

According to the aspect of this disclosure, the shutter support member of the grill shutter unit is opened downward. That is, in the grill shutter unit known in the related art, the lower frame portion is omitted and the lower ends of the side frame portions are directly assembled and attached to the air guiding plate. Thus, the grill opening may be enlarged by the lower frame portion, compared to the grill shutter unit known in the related art. Accordingly, the cooling performance of the vehicle radiator apparatus may be improved. In addition, the number of parts may be reduced, compared to the vehicle radiator apparatus known in the related art.

Another feature of the aspect of this disclosure resides in that the vehicle radiator apparatus further includes a radiator support member configured to support the radiator main body, the radiator support member includes a pair of left and right vertical column portions, and a horizontal column portion that interconnects the upper ends of the vertical column portions, and is opened downward, and the lower end of the radiator main body and the lower ends of the vertical column portions of the radiator support member are assembled and attached to a back end of the air guiding plate.

According to this configuration, the radiator support member is also opened downward like the shutter support member, and the lower ends of the vertical column portions are directly assembled and attached to the air guiding plate. Accordingly, the number of parts may be reduced, compared to a case where the lower frame portion of the radiator support member is provided as a separate member.

Another feature of the aspect of this disclosure resides in that the air guiding plate includes a shock absorbing member configured to absorb shock generated at the time of collision of the vehicle.

The shock generated at the time of collision of the vehicle is mainly absorbed by the shock absorbing member connected to a bumper reinforcement. The shock absorbing member according to this disclosure functions as an auxiliary member. Accordingly, the vehicle, to which the vehicle radiator apparatus according to this disclosure is applied, may absorb more shock.

Another feature of the aspect of this disclosure resides in that the shock absorbing member is provided to extend in the vehicle longitudinal direction, and the air guiding plate includes a holding portion configured to hold the shock absorbing member. According to this configuration, at the time of collision, it is possible to suppress the shock absorbing member from being separated and to suppress the middle portion of the shock absorbing member from being bent so that the shock absorbing member may exhibit a sufficient shock absorbing performance.

Another feature of the aspect of this disclosure resides in that the lower ends of the side frame portions of the grill shutter unit are assembled and attached to the shock absorbing member. According to this configuration, the grill shutter unit may be stably maintained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle radiator apparatus comprising:
   a radiator main body;
   a grill shutter unit configured to adjust the amount of air that is introduced from an opening formed in front of the radiator main body and flows toward the radiator main body; and
   an air guiding plate provided to extend in a longitudinal direction below the radiator main body and the grill shutter unit so as to guide the air introduced from the opening to the radiator main body,
   wherein the grill shutter unit includes:
      a shutter member configured to open or close the opening of a vehicle; and
      a shutter support member configured to support the shutter member, and including a pair of left and right side frame portions and an upper frame portion that interconnects upper ends of the side frame portions, the shutter support member being opened downward,
   wherein lower ends of the side frame portions of the grill shutter unit are assembled and attached to an upper surface portion of the air guiding plate,
   wherein the air guiding plate includes a plate-shaped portion and a shock absorbing member configured to absorb shock generated upon collision of the vehicle,
   wherein the shock absorbing member is configured to be compressed in a direction of a center axis thereof,
   wherein the shock absorbing member is formed in an angled tube shape,
   wherein the shock absorbing member is formed by a metal material,
   wherein the shock absorbing member is provided to extend in a vehicle longitudinal direction,
   wherein the lower ends of the side frame portions of the grill shutter unit are assembled and attached to the shock absorbing member,
   wherein the air guiding plate includes a holding portion configured to hold the shock absorbing member,
   wherein the holding portion is formed in a box shape that extends in the vehicle longitudinal direction and is open downward, and
   wherein the shock absorbing member is inserted into the holding portion.

2. The vehicle radiator apparatus according to claim 1, further comprising a radiator support member configured to support the radiator main body,
   wherein the radiator support member includes a pair of left and right vertical column portions, and a horizontal column portion that interconnects upper ends of the vertical column portions, and is open downward, and
   wherein lower ends of the radiator main body and lower ends of the vertical column portions of the radiator support member are assembled and attached to a back end of the air guiding plate.

3. The vehicle radiator apparatus according to claim 1, wherein through-holes are formed in a wall portion at the upper side of the holding portion so as to penetrate in the vehicle height direction, and
   wherein four female screws are formed in a wall portion at the upper side of the shock absorbing member to correspond to the through holes, respectively.

* * * * *